Sept. 7, 1937.  S. HAUT  2,092,510

TEA CONTAINING TEASPOON

Filed Nov. 25, 1936

INVENTOR.
Samuel Haut

Patented Sept. 7, 1937

2,092,510

UNITED STATES PATENT OFFICE 2,092,510

TEA CONTAINING TEASPOON

Samuel Haut, Brooklyn, N. Y.

Application November 25, 1936, Serial No. 112,663

REISSUED
JAN 3 0 1940

3 Claims. (Cl. 99—77.1)

This invention relates to an original package for tea, and one of its objects is to provide a package in the form of a teaspoon, made from paper or similar material, in the form of a container with perforated walls, to place a quantity of tea leaves in the container thus provided and to seal the same, so that the bowl of the spoon, forming the container for the tea leaves can be inserted in hot water placed in a serving cup or vessel, and tea brewed in the usual manner, after which the container teaspoon will be removed and discarded, being used but once.

Another object of the invention is to provide the bowl of the spoon with a marginal reinforcing edge, which is formed with an internal shoulder and provided with a disc in which perforated areas are provided, so that the tea leaves will be sealed in the container.

With the above and other objects in view the invention consists in certain new and useful constructions, combinations, and arrangements of parts, clearly described in the following specification, and fully illustrated in the drawing, in which.

Figure 1:
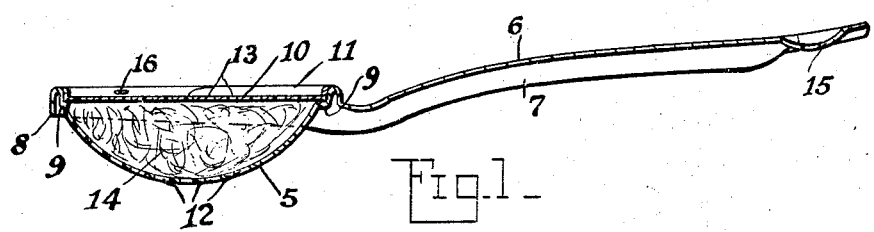
Fig. 1 is a longitudinal sectional view, taken on line 1—1 of Fig. 2, looking in the direction of the arrows.
Figure 2:
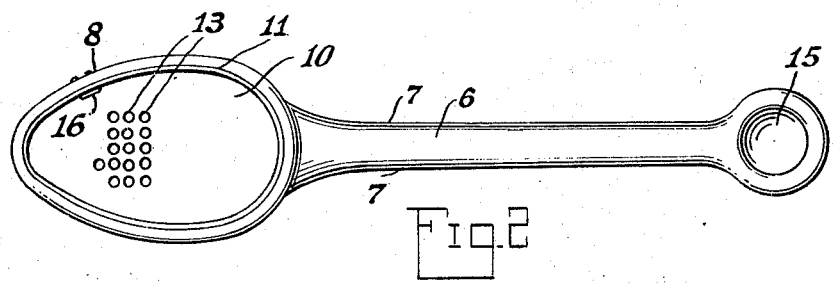
Fig. 2 is a plan view of the improved container.

Referring to the drawing illustrating the invention 5 designates the bowl of the spoon, which is made from paper of water resisting qualities, or of other suitable material. A handle 6 is formed integral with the bowl. This handle is formed U-shaped in cross-section, so as to provide a stiffening flange 7 on each side thereof.

The formation of this stiffening flange requires the molding or pressing of the paper or other stock by dies, and in order to reinforce and stiffen the marginal edge of the bowl 5 the edge of the spoon bowl is formed with a marginal flange 8, which may be slightly spaced from the bowl, so as to provide a yielding marginal wall portion for the bowl.

The bowl is formed with a shoulder or seat 9, coextensive with the rim thereof, and on this seat the closure disc 10 is placed. This disc is formed with a marginal upturned flange 11, which has a clutching engagement with the portion of the bowl disposed above the seat.

The bowl is formed with a series of perforations 12, and the disc closure 10 is formed with perforations 13, through which the hot water may freely penetrate to the tea leaves 14 which are sealed within the bowl or container.

The perforations are of such size and number as experience will determine best suited to promoting quick brewing of the tea leaves, without causing the tea leaves to drop from the bowl or container.

The handle may be formed with a finger seat 15, so that the user may more securely grip the same. The disc closure may be locked in place by crimping its marginal flange against the marginal edge of the spoon bowl, and by use of staples 16, driven through the marginal flange of the disc closure and the marginal edge of the spoon bowl, so that the disc closure will not be removed by any careless user, and the original contents will be sealed against unlawful tampering or substitution.

The spoon is inserted or immersed in the hot water, which is usually placed in a serving cup or vessel, and the spoon is stirred so that the tea is brewed to the desired strength. When the tea has been sufficiently brewed the container may be readily removed from the tea cup or serving vessel, and deposited on the saucer or other object suited for this purpose.

The combined original package thus includes a perforated container, in the form of a spoon bowl and closure which seals the dry tea leaves in the bowl; and a handle which serves to control the container, for insertion, mixing and removal, without exposing the fingers of the user to direct contact with the water in the tea cup or serving vessel.

Due to the fact that the marginal edge of the spoon bowl is reinforced by a depending flange, the spoon bowl will retain its container form for a prolonged period, when immersed in the hot water.

Some persons use a teaspoon only for mixing sugar and my improved spoon container and original package may be used by such persons to mix the sugar and cream for flavoring the tea beverage. The handle will always extend above and away from the cup, so that it cannot drop into the water or tea, and through such submersion delay the removal of the moistened tea leaves, with the result that the strength of the brewed tea is greater than desired by the consumer.

Due to the fact that the handle flange forms a part of the reinforcing system for the container, it is possible to make the improved original package by automatic machinery, by direct die pressure operation, from strip stock, and to fill the container bowls by automatic filling machinery, with the fewest possible operations.

The use of the double edge for the container bowl also permits the use of thinner and more economical stock.

The improved original package will be marketed in suitable boxes or cartons, sealed against dirt, and the handle has sufficient display surface on the top and on the sides thereof to carry the name of a hotel or other eating place, or the name of the maker of the tea.

The handle may also carry the advertising messages of other concerns, and the teaspoon package given away, either as a premium or as an attention exciting gift.

The paper or other stock employed may be rendered water resistant or water proof, by any method or means which is adapted for the purpose, but a suitable water resisting stock is available, which has been found to retain its original stiffness for a considerable time, after immersion in hot water, and which can be pressed into the desired form under production conditions.

I claim as new:—

1. A tea package comprising a teaspoon shaped vessel of paper having a handle and a perforate bowl of a size to contain a single charge of tea, a cover of paper for closing said bowl, said bowl and said cover comprising two elements, one of which has a peripheral groove facing inwardly to receive the periphery of the other element and having its material flanged over to reinforce its grip upon the other element and a charge of tea within said bowl.

2. A tea package comprising a tea spoon shaped vessel of paper having a handle and a perforate bowl of a size to contain a single charge of tea, a cover of paper for closing said bowl, said bowl having a peripheral groove facing inwardly to receive and hold the edges of said cover and a charge of tea within said bowl.

3. A tea package comprising a teaspoon shaped vessel of paper having a handle and a perforate bowl of a size to contain a single charge of tea, a cover of paper for closing said bowl, said bowl having a peripheral groove facing inwardly to receive and hold the edges of said cover, and being flanged over to strengthen its periphery to assist in holding said cover in place and a charge of tea within said bowl.

SAMUEL HAUT.